United States Patent
Becker

(10) Patent No.: US 9,333,381 B2
(45) Date of Patent: May 10, 2016

(54) SAFETY FITTING FOR BLOCKING A LINE

(76) Inventor: Dominic Becker, Möhnesee (DE)

( * ) Notice: Subject to any disclaimer, the term of this patent is extended or adjusted under 35 U.S.C. 154(b) by 0 days.

(21) Appl. No.: 13/884,449

(22) PCT Filed: Nov. 10, 2011

(86) PCT No.: PCT/DE2011/001965
§ 371 (c)(1),
(2), (4) Date: Jul. 19, 2013

(87) PCT Pub. No.: WO2012/062285
PCT Pub. Date: May 18, 2012

(65) Prior Publication Data
US 2014/0000918 A1    Jan. 2, 2014

(30) Foreign Application Priority Data
Nov. 10, 2010   (DE) .......................... 10 2010 050 782

(51) Int. Cl.
| | | |
|---|---|---|
| F16K 31/12 | (2006.01) | |
| A62C 4/02 | (2006.01) | |
| F16K 17/28 | (2006.01) | |
| F16K 17/32 | (2006.01) | |

(52) U.S. Cl.
CPC . *A62C 4/02* (2013.01); *F16K 17/28* (2013.01); *F16K 17/32* (2013.01)

(58) Field of Classification Search
CPC ........... A62C 4/02; F16K 17/28; F16K 17/32; F16K 17/30; F16K 17/36; Y10T 137/7785; Y10T 137/7727; Y10T 137/7728; Y10T 137/7771; Y10T 137/778; Y10T 137/7866

USPC ......... 137/498, 460, 461, 493, 493.9, 516.25; 277/583, 605, 646
See application file for complete search history.

(56) References Cited

U.S. PATENT DOCUMENTS

| | | | | |
|---|---|---|---|---|
| 1,125,315 | A | | 1/1915 | Hayward |
| 1,834,988 | A | * | 12/1931 | White ........................... 251/173 |
| 2,081,842 | A | * | 5/1937 | Brunswick .................... 251/173 |
| 3,085,589 | A | | 4/1963 | Sands |
| 3,683,957 | A | * | 8/1972 | Sands ............................ 137/460 |
| 4,465,093 | A | * | 8/1984 | Gold et al. .................... 137/498 |
| 4,811,756 | A | * | 3/1989 | Hall .............................. 137/498 |
| 7,343,927 | B2 | * | 3/2008 | Zellweger ..................... 137/460 |
| 2004/0031524 | A1 | * | 2/2004 | Schulze ......................... 137/460 |
| 2010/0012202 | A1 | * | 1/2010 | Norbert et al. ................ 137/535 |
| 2010/0218963 | A1 | | 9/2010 | Zellweger |

FOREIGN PATENT DOCUMENTS

| | | |
|---|---|---|
| DE | 18 91 718 | 4/1964 |
| DE | 1816548 A | 9/1970 |

(Continued)

OTHER PUBLICATIONS

International Search Report issued by the European Patent Office in International Application PCT/DE2011/001965 on Jun. 4, 2012.

*Primary Examiner* — Jessica Cahill
(74) *Attorney, Agent, or Firm* — Henry M. Feiereisen LLC.

(57) ABSTRACT

A safety fitting for blocking a line, includes a blocking body that is located in a widened section of a housing, can be guided linearly in the direction of flow of the line and is held in an open position. The blocking body can be moved under the influence of a pressure fluctuation in the line or moved actively into a sealing position. The housing has a cylindrical sealing section, in which the blocking body engages with a cylindrical section thereby forming a cylindrical annular gap.

9 Claims, 4 Drawing Sheets

(56) References Cited

FOREIGN PATENT DOCUMENTS

| DE | 2801950 A1 | 8/1978 |
| DE | 19837325 C1 | 7/1999 |
| DE | 198 37 146 | 3/2000 |
| DE | 199 57 407 | 6/2001 |
| DE | 101 08 537 | 5/2002 |
| DE | 103 40 679 | 3/2005 |
| WO | WO 2006/120091 | 11/2006 |

* cited by examiner

SAFETY FITTING FOR BLOCKING A LINE

CROSS-REFERENCES TO RELATED APPLICATIONS

This application is the U.S. National Stage of International Application No. PCT/DE2011/001965, filed Nov. 10, 2011, which designated the United States and has been published as International Publication No. WO 2012/062285 A2 and which claims the priority of German Patent Application, Serial No. 10 2010 050 782.2, filed Nov. 10, 2010, pursuant to 35 U.S.C. 119(a)-(d).

BACKGROUND OF THE INVENTION

The invention relates to a safety fitting for flame-arresting blocking of a line that conducts gas or dust containing gas.

The state-of-the-art includes safety fittings as exemplified by WO2006/12 0091 A1. The safety fitting described in WO2006/12 0091 A1 includes a sealing body which is movable inside a housing, which sealing body is guided on a guiding rod and is displaceable from a predefined open position into a sealing closed position in response to a pressure or suction wave. For holding in the open position, various spring arrangements are provided. In the closed position, the sealing body comes into contact with a radial surface on a sealing which is fixed in position. In dusty environments, this has the disadvantage that a dust plume which has formed in the region of the sealing cannot be disrupted, at least not reliably. As a result, the sealing body rests against the provided sealing at a slant and thus does not close securely. In the explosion protected area, flames may penetrate the formed gap, thus rendering the safety fitting ineffective. A further disadvantage is that the relatively thick sealings have to be machined elaborately in order to adjust them to the contour of the sealing body. In this regard, it would be desirable to be able to use standard sealings.

SUMMARY OF THE INVENTION

Given the foregoing, the invention is based on the object to provide a safety fitting which causes a secure sealing even when a dust plume has formed in the region of the sealing.

This object is solved by a safety fitting which includes a housing having a widened section and a cylindrical closing section, and a blocking body, having a cylinder section that defines a maximal diameter of the blocking body, wherein the blocking body is held in an open position in the widened section of the housing, and is guidedly and linearly displaceable in the line in a direction of flow of the line into a closed position, actively or in response to a pressure fluctuation, wherein in the closed position, the cylinder section of the blocking body engages in the cylindrical section of the housing, thereby forming a cylindrical annular gap.

The sub claims relate to advantageous refinements of the invention.

The safety fitting according to the invention for blocking a line includes a widened section of a housing. Located in this widened section is a guided and linearly displaceable blocking body. Usually, the blocking body is in an open position. It can be held in this open position by appropriate spring means. Under the influence of a pressure fluctuation in the line, in particular in case of an explosion and/or under the influence of an actuator, the blocking body is displaced from its open position into a closed position. The particular feature is here that the housing has a cylindrical closing section in which the blocking body engages in the closed position with a cylinder section, thereby forming a cylindrical annular gap.

In contrast to the state-of-the-art, the blocking body does not come into contact with a radial surface on a sealing, but a cylindrical annular gap is formed.

Formation of this annular gap strictly requires a displacement of a relatively sharp edge along a fixed edge. This movement leads to a shearing off of a dust plume, which may have settled in the region of the closing section. This shearing off of the dust plume would not be possible with the desired reliability if the sealing was arranged between the front side of the blocking body and the housing. The safety fitting according to the invention allows realizing a high tolerance against contaminations predominantly as a result of product deposits, in particular in horizontal lines when conducting dust. However, the invention allows realizing these types of safety fittings which are also referred to as check valves, also in the field of explosion protection or flame-arresting decoupling, for example of pneumatic production plants and suction lines with very high dust content, in particular when product buildups in the region of the widened section of the housing and thus also in the closing section are to be expected. Accordingly, the safety fitting according to the invention is preferably used as check valve for decoupling, but also for securing against pressure waves, for the supply air and exhaust air of safety rooms for example for military installations.

Tests haven shown, that a flame-arresting gap sealing can only be realized under narrowly defined circumstances i.e., when the annular gap has a length of at least 20 mm and a width in a range from 0.2 mm to 0.5 mm. The width can vary over the length of the annular gap within the aforementioned limits. Preferably, the annular gap has a length of 25 to 35 mm. In a practical exemplary embodiment, a length of 30 mm was selected. The length of the annular gap means those regions in which the blocking body is actually arranged at the radial distance to the surrounding closing section. At least one region of this closing section is therefore configured cylindrical. It is also conceivable, however, that for constructive reasons a smaller circumferential groove is also arranged in this closing section. It is also conceivable that the cylinder section of the blocking body has an upstream located, slightly conical section.

It is essential, that the annular gap is configured flame-arresting. It has been shown, that this can be achieved when the closing section together with the circumferential section which surrounds the dosing section has a heat capacity which is sufficiently great so that more heat is withdrawn from a flame in the annular gap than can be created by combustion in the annular gap. This causes the flame to be suffocated. This is in particular achieved by a very large surface of the annular gap, via which heat can be dissipated, relative to the very small volume of the annular gap.

In principle, the safety fitting with the provided gap sealing is sufficient to ensure flame arresting capability. Therefore, the region of the blocking body with the greatest diameter forms the cylinder section. Further gradations are generally not required. The blocking body itself which for flow technical reasons is configured as double cone or in the shape of a double cone, thus has the cylinder section in its center region. Such a cylinder section can be manufactured easily. The cylinder section can also be referred to as piston section.

In contrast to WO 2006/120091 A1, in the closed position, the blocking body is displaced out of a widened section of the housing into a cylindrical section of the housing. Preferably, the cylinder section has an outer diameter which approximately corresponds to the inner diameter of the line, in which the safety fitting is used. Therefore, it is possible to displace the closing body in the closed position to the most degree out of the widened section of the housing into a cylindrical section of the housing.

When in addition to the flame arresting protection, gas tightness has to be created, a sealing ring can be provided for closing the annular gap, wherein in a preferred exemplary embodiment, the sealing ring is arranged on the end of the blocking body which enters into the closing section last.

As an alternative, the sealing ring can be arranged on the closing section.

An advantage of the configuration according to the invention is that a standard sealing ring can be used as sealing ring, which does not have to be specially adjusted to the contouring of the blocking body. The sealing ring can reduce the width of the annular gap in the region of the sealing ring to the value 0. When gas tightness is sought, a gap width of −0.2 mm can be set, which can be formed by an elastomer-sealing ring. Such a sealing ring can also be set to a gap width of up to −0.5 mm which allows achieving a gas tightness up to 2 bar.

The sealing can be an O-ring. Such an O-ring can also seal against a slant which is either formed on the housing or on the blocking body. Such a narrow slant or slanted surface can form a small stop. Important is that the blocking body can be displaced back again. It must not jam but has to be capable to be easily displaced back again. The blocking body can be held in the closing position additionally in that the sealing ring is inflatable so that the sealing ring exerts a higher pressing force onto the section of the blocking body. Generally however, apart from this pressing force in the region of the associated closing—and cylinder sections, the blocking body is to be held jam free in relation to the housing. Thus, the closing body remains in its closed position not by way of jamming, but because a spring force is additionally exerted and because, as the case may be, an additional fixing device is provided. This fixing device can for example be released manually. The closing body is then to be automatically displaced back into the open position. This occurs by means of spring force. The force required for this has to be sufficient to overcome latching units which may be present and are provided for the positional fixing of the blocking body in the open position.

Because the safety fitting according to the invention is preferably used in explosion protected areas, high forces occur during closing, in particular when very short closing times are required which are further shortened by introducing external energy. The accelerated mass of the blocking body thus has to be decelerated to prevent mechanical damage to the safety fitting. In the case of mechanical dampening by springs or elastomers, and in particular in case of a pneumatic dampening, as it is required in the case of a closing process by external energy (e.g. a gas generator, pressured air or spring force), spring-back of the blocking body of two to ten millimeters is to be expected. Within the scope of the invention, the blocking body always enters into the closing section to the extend that an annular gap of at least 20 mm length remains even at maximal spring-back, in order to ensure flame arresting capability. Within the scope of the invention, the travel of the spring-back can be reduced in that the fixing device prevents the return of the closing body after decrease or cessation for example of an explosion pressure. This allows limiting the spring-back to one to two millimeters at corresponding manufacturing accuracy.

The particular advantage of the safety fitting according to the invention which is intended to be used in piping systems, which conduct gases and in particular dust containing gases, is the increased tolerance against contaminations due to product deposits in the widened section of the housing and that flames are suffocated in the very small annular gap, because the flames come into contact with a relatively large surface with high heat capacity which causes energy to be withdrawn from the gas stream. The created safety fitting created in this way can thus be configured flame-arresting and gas tight.

BRIEF DESCRIPTION OF THE DRAWING

In the following, the invention is explained in more detail by way of exemplary embodiments shown in the drawings. It is shown in.

DETAILED DESCRIPTION OF PREFERRED EMBODIMENTS

Figure 1:
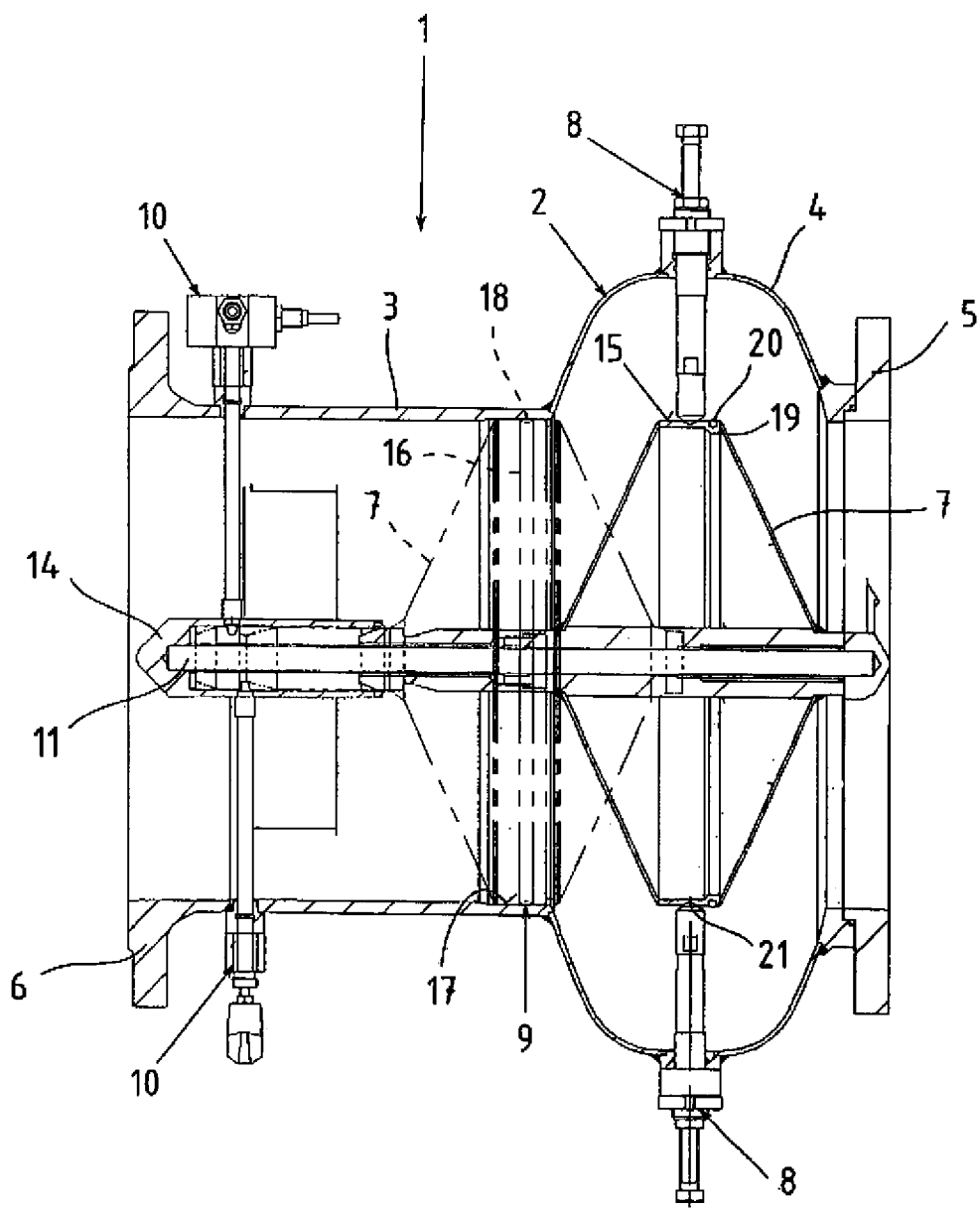
FIG. 1 a longitudinal section through a first embodiment of a safety fitting according to the invention.

FIG. 1 shows a safety fitting 1 which is provided for blocking a not further shown line. The safety fitting 1 is used for example in pneumatic conveyer systems and suction lines with high dust proportion. The safety fitting 1 thus serves for blocking a gas conducting line.

The safety fitting 1 has a housing 2 which has a pipe socket 3 and a widened section 4 adjoining the pipe socket 3. On the right side in the image plane, an end-side flange 5 adjoins the widened section 4. On the left side in the image plane, a further flange 6 is present on the end of the pipe socket 3 in order to connect the safety fitting 1 with the line. In longitudinal direction of the safety fitting 1, a double-cone shaped blocking body 7 is provided in the widened section 4, and is held in the shown open position by latching units 8. The blocking body 7 is additionally held in the open position via not further shown springs.

In the case of inadmissible increase of pressure or flow in the line and with this also in the housing 2, the blocking body 7 is displaced in the image plane towards the left, in the direction of a sealing seat 9 and is secured in this position by means of a fixing device 10. This fixing device 10 can be manually released again. In the drawing, the blocking body 7 is shown in the open position (solid line) and in the image plane to the left side in the closed position (dashed line). It can be seen how the fixing device 10 engages in a circumferential recess of a guiding rod 11, via which the blocking body 7 is centrally guided inside the housing 2.

Figure 2:
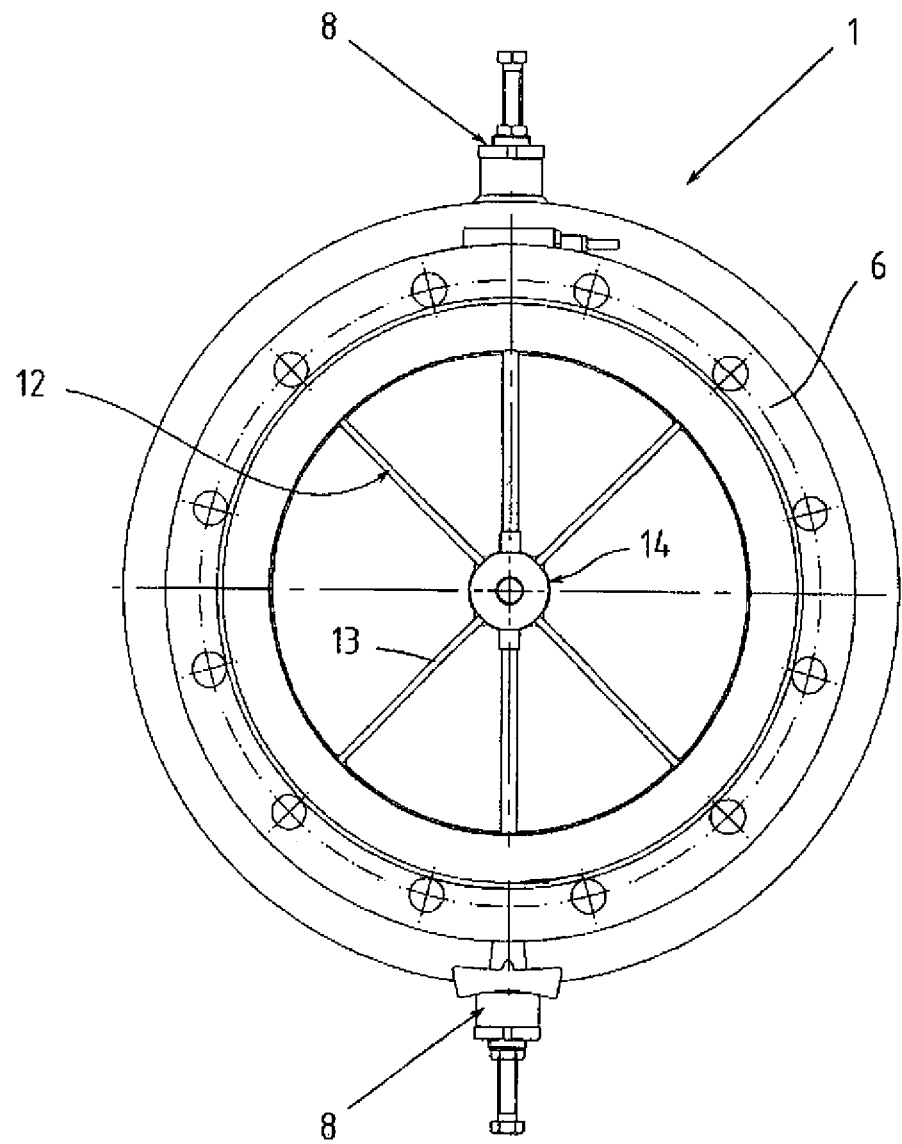
FIG. 2 the safety fitting of FIG. 1 in a front view.

FIG. 2 shows a front view of a star-shaped holding device 12, in the direction of view towards the flange 6, which holding device 12 supports a central guide housing 14 for the guiding rod, 11 via struts 13 which extend in radial direction.

In the safety fitting 1 according to the invention, the geometry of the blocking body 7 is important for the function. The blocking body 7 has a cylinder section 15 in a center region which at the same time is the region with the greatest outer diameter. In this exemplary embodiment, the cylinder section 15 is impinged upon by latching units 8. For this, a circumferential groove 16 is present in the cylinder section 15, which groove 16 can be recognized on the blocking body 7 in the closed position. The groove 16 is relatively flat and rounded in its base. It is fitted to the geometry of a spherical latching member 21 which is located on the inner end of the latching unit 8 and is under the influence of a spring force. The latching unit 8 can be adjusted with regard to the spring preload so that different trigger forces can be finely adjusted. The latching units 8 are arranged diametrically.

The outer diameter of the cylinder section 15 is adjusted to an also cylindrical closing section 17 which is adjacent to the widened section 4, 4a in the pipe socket 3. It can be seen that the blocking body 7 which has been displaced into the closed position enters the closing section 17 with its complete cylinder section 15 i.e., with the entire length of the cylinder section 15, so that the predominant portion of the blocking body 7 is displaced out of the widened section 4 of the housing 2 into the cylindrical section, i.e., into the pipe socket 3 of the housing 2. As a result, the cylinder section 15 forms a narrow annular gap 18 with the closing section 17, having a length of 30 mm and a width of 0.5 mm.

The annular gap 18 is of a length so that the safety fitting 1 is configured flame-arresting. In addition, a sealing ring 20 is arranged on the end of the cylinder section 15 which is on the right side in the image plane, i.e., on the end 19 which is distal to the closing section 17, via which sealing, ring 20 the annular gap 18 is additionally configured gas tight.

In this exemplary embodiment, the annular gap 18 has a width of 0.2 to 0.5 mm. This means the mean width which is averaged across the circumference and the length of the cylinder section 15.

Figure 3:
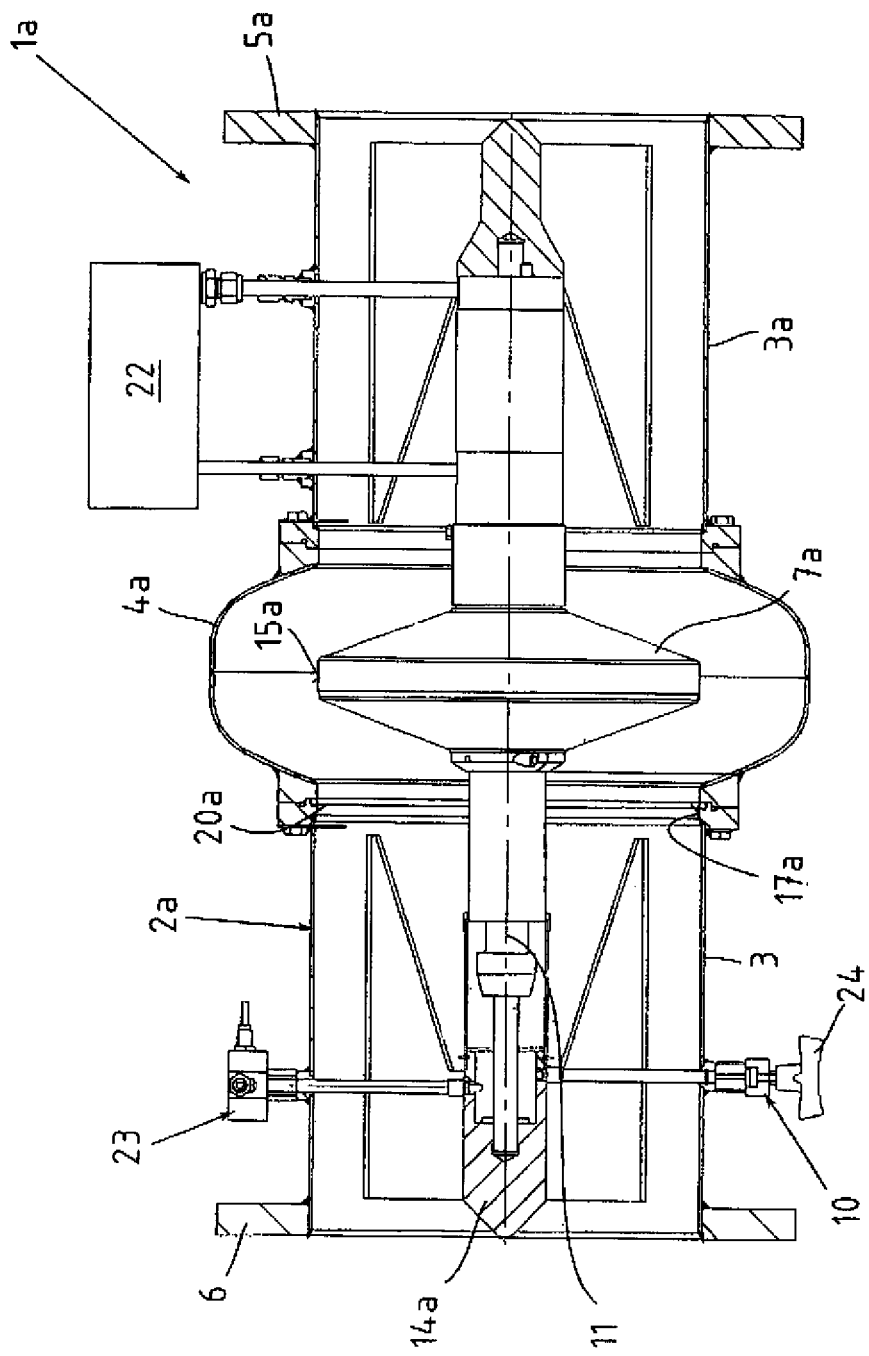
FIG. 3 a further embodiment of the safety fitting according to the invention and FIG. 4 the safety fitting of FIG. 3 in a front view.

The embodiment of FIG. 3 differs from the one of FIG. 1 in that a second pipe socket 3a is present and in that the flange 5a is arranged at a correspondingly greater distance to the widened housing section 4.

In this embodiment, the widened housing section 4 is located in the center of the safety fitting 1a.

Like in the first embodiment, the blocking body 7a is again configured as double cone, however, no latching unit is provided as in FIG. 1. Accordingly, the cylinder section 15a is also configured without circumferential groove. In addition, no sealing ring is provided on the cylinder section 15a. In this embodiment, the sealing ring is located on the closing section 17a of the housing 2a. The sealing ring 20a is located on the end of the closing section 17a that faces away from the widened section 4. This ensures, that a possible dust plume which extends from the widened section 4 over the lower region of the closing section 14 up to the pipe socket 3 is first disrupted by the cylinder section 15a of the blocking body 7a before it comes to rest against the sealing 20a. This renders the formed annular gap not only flame-arresting but closes the annular gap gas tight. In an alternative embodiment, the sealing can be configured inflatable and with this achieve any desired degree of tightness in the annular gap. Before the blocking body 7a is displaced into its shown open position again, the inflated sealing is released so that the pressing force which acts on the cylinder section 15a decreases and the blocking body 7a can be displaced jam free back into the open position.

A further difference relative to the embodiment of FIG. 1 is that the shown safety fitting 1a can be controlled via a pneumatic control block 22 in order to displace the blocking body 7a from the open position into the closed position with a very short closing time. This can for example occur by means of a gas which is pre-pressurized in a gas accumulator or by means of a pyrotechnical trigger. Via a detection device 23, it can be determined whether the blocking body 7a is in the open position or in the closed position. The fixing device 10 already mentioned in FIG. 1, which is arranged opposite the detection device 3, can be manually released again via a handle 24, in order to displace the blocking body 7a back into the starting position again.

Figure 4:
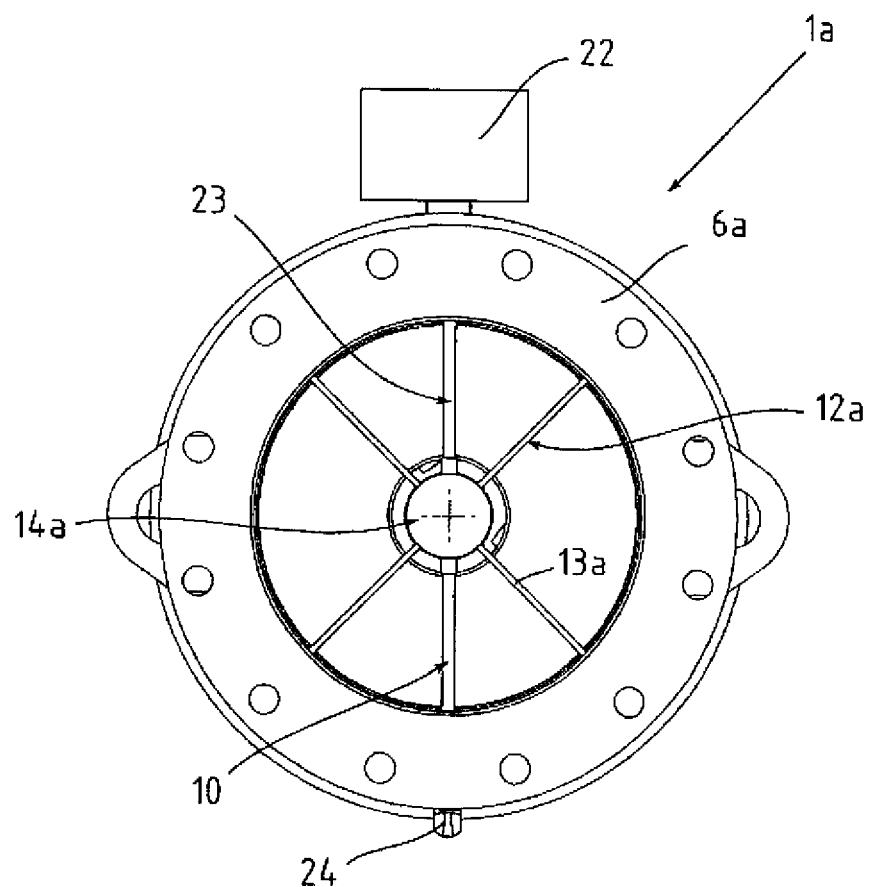

FIG. 4 shows the safety fitting according to FIG. 3 in the front view onto the flange 6, wherein again a guide housing 14a is held via a holding device 12a by means of shaped arranged struts 13.

The invention claimed is:

1. A Safety fitting for blocking a line, comprising:
   a housing having a widened section and a cylindrical closing section; and
   a blocking body, having a cylindrical section defining a maximal diameter of the blocking body, said blocking body being held in an open position in the widened section of the housing, and being guidedly and linearly displaceable in the line in a direction of flow of the line into a closed position, actively or in response to a pressure fluctuation, wherein in the closed position, the cylindrical section of the blocking body engages in the cylindrical section of the housing, thereby forming a cylindrical annular gap between the cylindrical section of the housing and the maximal diameter of the blocking body.

2. The safety fitting of claim 1, wherein the annular gap has a length of at least 20 mm and a width in a range from 0.2 mm to 0.5 mm.

3. The safety fitting of claim 1, wherein the annular gap has a length from 25-35 mm.

4. The safety fitting of claim 1, wherein a combined heat capacity of the closing section and the cylindrical section of the blocking body withdraws more heat from a flame in the annular gap than generated by combustion in the annular gap.

5. The safety fitting of claim 1, wherein in the closed position a predominant portion of the blocking body is displaced out of the widened section of the housing into the cylindrical section of the housing.

6. The safety fitting of claim 1, further comprising a sealing ring for closing the annular gap, wherein the sealing ring is arranged on an end of the blocking body which enters the closing section last.

7. The safety fitting of claim 1, wherein the blocking body is held jam free relative to the housing in the region of the associated closing and cylinder sections.

8. The safety fitting of claim 1, further comprising a sealing ring for closing the annular gap, wherein the sealing ring is arranged on the closing section.

9. The safety fitting of claim 8, wherein the sealing ring is inflatable to exert a pressing force on the cylindrical section of the blocking body in the closing position.

* * * * *